Sept. 21, 1971  J. J. ROBINSON, JR  3,606,699
GATE CONTROL DRIVE UNIT
Filed Sept. 16, 1969  3 Sheets-Sheet 1
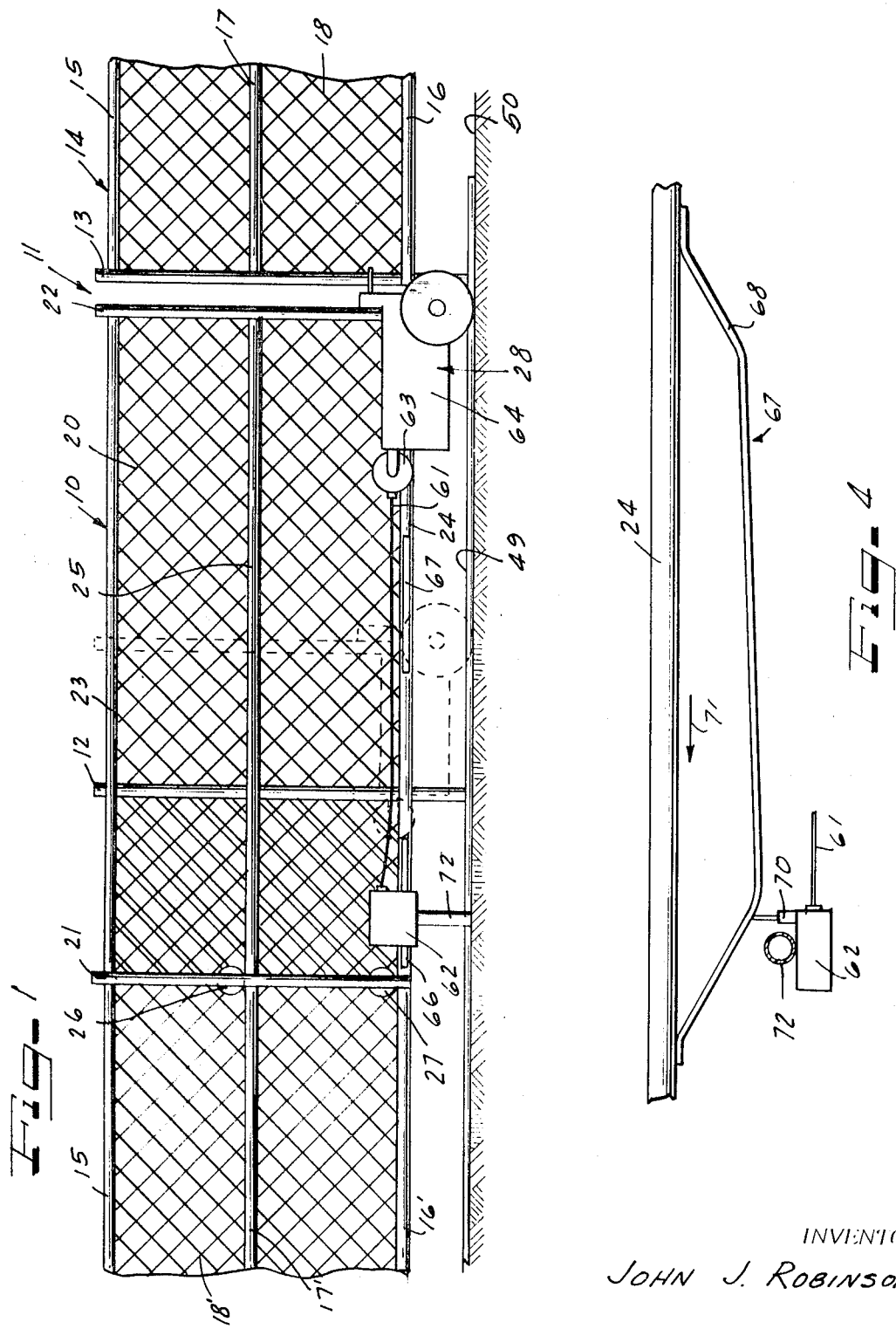
INVENTOR.
JOHN J. ROBINSON, JR.
BY *Hill, Sherman, Meroni, Gross & Simpson* ATTORNEYS

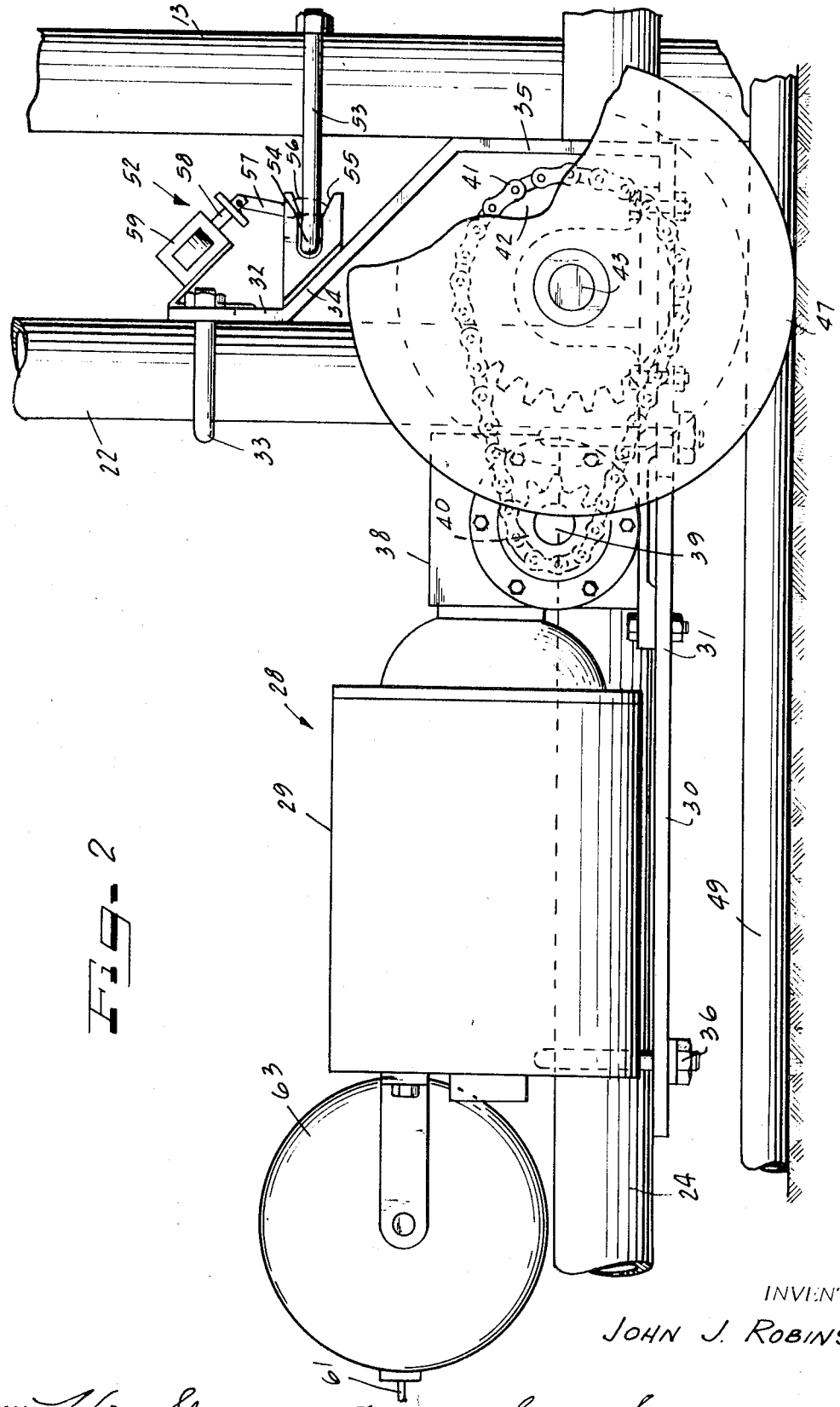

Sept. 21, 1971     J. J. ROBINSON, JR     3,606,699
GATE CONTROL DRIVE UNIT
Filed Sept. 16, 1969     3 Sheets-Sheet 3
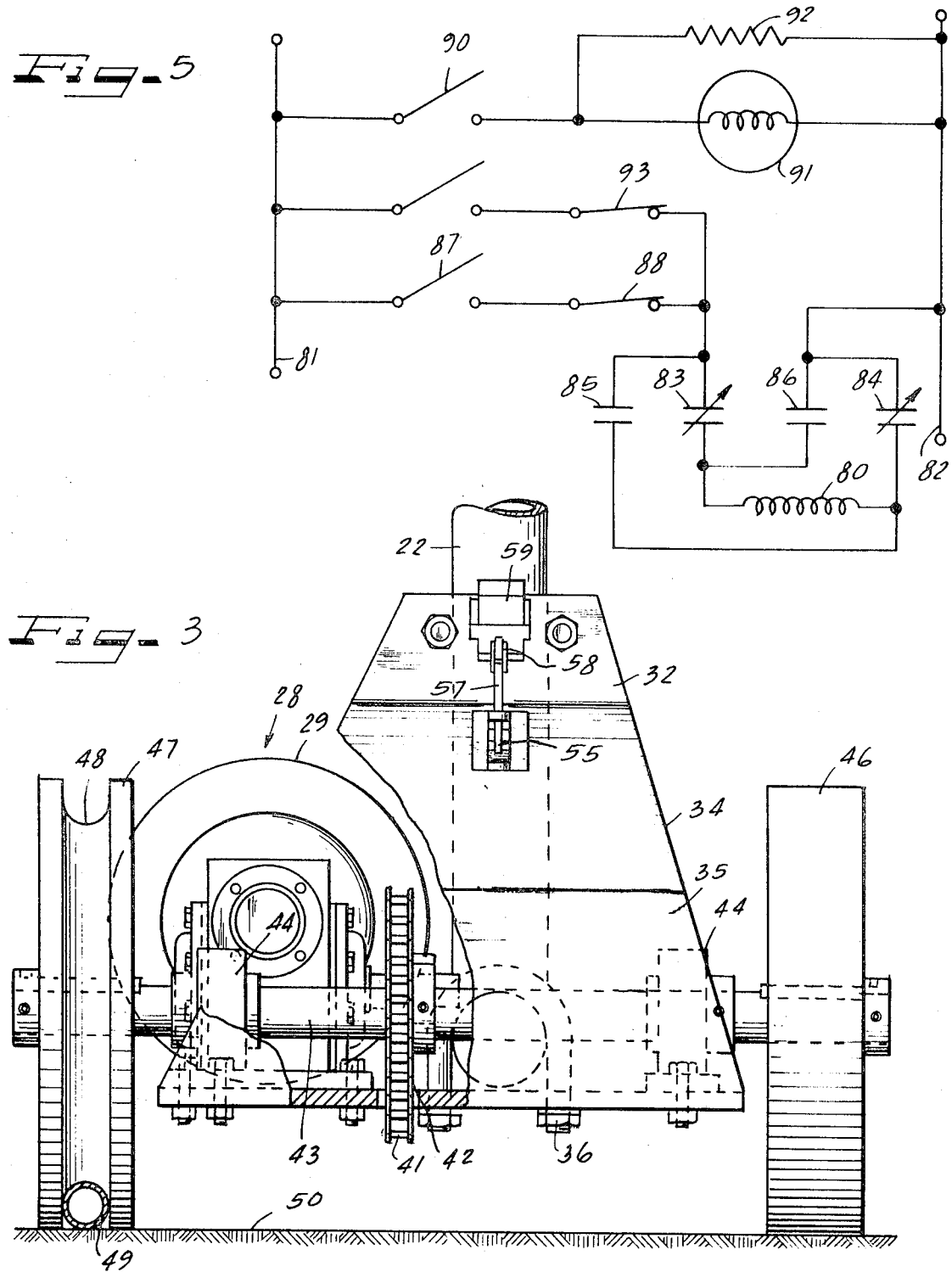
INVENTOR.
JOHN J. ROBINSON, JR.

3,606,699
GATE CONTROL DRIVE UNIT
John J. Robinson, Jr., Box 1015, Fabens, Tex. 79838
Filed Sept. 16, 1969, Ser. No. 858,383
Int. Cl. E05f *15/14*
U.S. Cl. 49—280            3 Claims

ABSTRACT OF THE DISCLOSURE

A sliding gate structure supported at one end by rollers engaging tracks on a fence structure and at the other end by a drive unit having a reversible electric motor driving a ground engaging wheel and a second grooved wheel riding on a track disposed across the opening in the fence structure. The drive unit is rigidly attached to the gate and supports the other end and provides a mounting surface for a solenoid actuated latching device which engages a latch member attached to a gate post of the fence to hold the gate in the closed position.

BACKGROUND OF THE INVENTION

Field of the invention

The present invention is directed to a gate structure and particularly a sliding gate structure having drive means for opening and closing the gate with respect to an opening in the fence.

Description of the prior art

Presently known and available gate structures having drive units for opening and closing the gate have proven unreliable and are expensive to install and maintain. For example, the gate structures require a large number of rollers for supporting and positioning the gate as it moves between an opened and closed position. The gate in order to function in all types of climate conditions must be unaffected by high winds, and precipitation such as rain or snow. In order to provide a structure which will withstand winds, the existing gate devices require a large number of guiding and support rollers cooperating with several guiding tracks. An example of such a device is illustrated in the Mealer U.S. Pat. 3,257,756. However, a device such as that illustrated in Mealer requires extensive use of several guiding tracks and rollers along with a rack and gear drive means which increases the cost of installation and maintenance of the gate structure.

SUMMARY OF THE INVENTION

The present invention is directed to a gate having a drive unit for opening and closing the gate utilizing a minimum number of support rollers and including a power driven drive wheel engaging the ground and a groove follower riding on a track disposed on the ground for guiding the gate while moving between an open and closed position. The preferred embodiment includes an electrically controlled latching device mounted on the drive unit for engaging a latch member disposed on a post of the fence structure to hold the gate in the closed position.

Accordingly, it is an object of the present invention to provide a gate structure having a controlled drive unit to move the gate between an open and closed position, and for controlling the movement of the gate during its travel between the open and closed position.

Another object of the present invention is to provide a gate structure which is inexpensive to construct and easy to maintain.

A still further object of the present invention is to provide a gate structure having a control drive unit including an electrically operated latch device for holding the gate in the closed position.

Other objects, features and advantages of the invention are readily apparent from the following description of the preferred embodiment thereof, taken in conjunction with the accompanying drawings, although variations and modifications may be effected without departing from the spirit and scope of the novel concept of the disclosure.

BRIEF DESCRIPTION OF THE DRAWINGS

FIG. 1 is an elevational view of the gate structure of the present invention in a closed position and the open position is illustrated in dashed lines.

FIG. 2 is an enlarged view of the drive unit and the gate structure with the outer protective case removed and portions broken away for purposes of illustration.

FIG. 3 is an end view of the drive unit of FIG. 2 with portions broken away for purposes of illustration.

FIG. 4 is an enlarged plan view of a cam attached to the gate structure in cooperation with a limit switch; and FIG. 5 is a circuit diagram of the control circuit for providing control of the drive unit.

AS SHOWN ON THE DRAWINGS

Although the principles of the present invention are of utility in any gate drive system requiring guiding of the gate as it is moved between the open and closed position, they are particularly useful when incorporated in a sliding gate structure and the illustrative embodiment herein shown illustrates the novel structure utilized in a sliding gate structure generally indicated at 10 in FIG. 1. The gate structure 10 closes an opening 11 defined by end posts 12 and 13 of a fence structure 14.

As illustrated, the fence structure 13 has a frame formed by the end post such as 12, an upper support member 15, a lower support member 16 and a middle or intermediate support member 17, which support members are illustrated as tubular members. The frame structure formed by the support members and the end post provide a frame for a wire material such as 18.

The gate structure 10 has a wire material supported on a frame formed by a pair of vertical members 21 and 22, an upper member 23, a lower member 24 and a middle member 25. To support the end designated by the vertical member 21, a pair of rollers 26 are rotatably mounted on the vertical member 21 and ride on tracks formed by the middle member 17′ and the lower member 16′ of the fence structure 14. The other end of the gate structure 10 which is defined by the vertical member 22 is supported by a drive means generally indicated at 28. The gate structure 10 and the fence structure 14 are illustrated as being constructed of frame members formed of tubular members; however, any structural members such as channels or L-shaped structural members can be used in forming the frames.

The drive means 28 includes a reversible electric motor 29 (FIG. 2) which is mounted on a platform portion or bed plate 30 of a frame member or plate 31. As illustrated, the frame member 31 has an upright portion 32 which is connected by a U-bolt 33 to the vertical member 22 at the gate structure 10. The upright portion 32 is connected to the platform portion 30 by an offset portion 34 and a parallel second upright portion 35 which is attached to the platform 30. Preferably the frame member 31 is formed by bending a flat plate into the configuration illustrated in FIG. 2. To complete the attachment of the frame plate 31, the platform 30 is attached by a U-bolt 36 to the lower member 24 of the gate structure 10.

The output shaft of the reversible electric motor 29 is connected to an angle box 38 which can be a conventional worm gear drive box. Disposed on the output shaft 39 of the box 38 is a sprocket 40 which is connected by a chain belt 41 to a sprocket 42 attached to a shaft 43 mounted for rotation in a pair of bearing blocks 44, 44, best illustrated in FIG. 3. The shaft 43 has keyed on one end a ground engaging wheel 46 which preferably has a rubber tire and a follower 47 having a groove 48 for engaging a track means 49 disposed on the ground surface 50. Track means 49 as illustrated in FIG. 3 can be a pipe or any other device providing a guiding means for the follower 47 which is a grooved wheel structure of the drive means 28.

As illustrated, each of the units such as the angle box 38 and the bearing blocks 44 are attached to the platform or bed plate 30 of the frame 31. The offset portion 34 between the upright portions 32 and 35 provides a space between the vertical member 22 and the upright portion 35 to allow the shaft 43 to be disposed between the vertical member 22 and the portion 35.

The offset portion 34 and the upright portion 32 provide a mounting surface for a component of a latching means 52. The latch means 52 comprises a latch member 53 illustrated as connected to the gate post 13 and having a bite portion 54 which is received in a notch or groove 55 and held by a lock member 56. The lock member 56 is mounted on a lever arm 57 which is pivotally attached to the armature 58 of the solenoid 59. When the solenoid is energized the lock member 56 is withdrawn from the notch 55 to release the latch member 54 therefrom. The lock member 56 is yieldably mounted to the armature 58 so that as the gate moves to the closed position, the bight portion 54 rotates the lock member 56 in a clockwise direction as illustrated in FIG. 2 to allow the bight portion 54 to enter into the notch 55.

To provide a power source for the electrical motor 29 and control signals for the motor 29 and the solenoid 59, a cable 61 extends to an electrical box 62 which either includes the control means and the power source for the drive means 28 or is electrically connected thereto. To prevent the cable 61 from being damaged from engagement in the drive means and in particular by the grooved wheel 47, a rewind mechanism 63 is attached to the drive means 28 and extends out of the outer case 64 at the drive means or unit 28.

To stop the drive means 28 after the gate has reached a predetermined position, such as the closed position illustrated, or the fully opened position, spaced cam means 66 and 67 are mounted on the lower frame member 24 to engage a limit switch of the control means. As best illustrated in FIG. 4, a cam surface such as 67 is formed by a bent strap 68 attached to the member 24. A limit switch 70 engages the strap 68 as the gate moves in a direction indicated by the arrow 71. The limit switch 70 preferably is mounted on the box 62 which is mounted on a pipe or support 72. The cam means 66 is of a similar structure as cam 67 and is spaced near the vertical member 21 to stop the drive means 28 as the gate reaches the closed position.

Although various control circuits can be utilized in this system, a circuit illustrated diagrammatically in FIG. 5 will perform the necessary control functions for the system. As illustrated, a motor winding 80 is connected between the two power lines 81 and 82 of an electrical circuit by relay contacts 83, 84 which are normally closed and contacts 85 and 86 which are normally opened. When a forward switch 87 is closed, the winding 80 is connected through the contacts 83 and 84 to the power lines 81 and 82. When the limit switch 88 is actuated by the cam means disposed on the gate structure, the circuit is opened to stop the motor. When the reverse direction switch 90 which has two switch portions is closed and the switch 87 is opened, the relay 91 is actuated to close the contacts 85 and 86 and to open the contacts 83 and 84 to reverse the connection of the coil 80 between the lines 81 and 82 and therefore reverses the output direction of the motor 29 of the drive means 28. The switch 90 also energizes the winding 92 of the solenoid 59 to cause the disengagement of the latch member 53 to unlatch the gate from the vertical post 13 of the fence structure. The drive means 28 operates to open the gate until a limit switch 93 is actuated to open the circuit to stop the flow of current through the coil 80 and stop the drive means.

As illustrated, the gate structure 10 utilizes a minimum number of support rollers such as 26 and 27 and the end defined by the vertical member 22 is supported solely by the drive means 28. The track 49 insures that the gate structure 10 moves in a desired path regardless of wind conditions or the presence of snow. Preferably the axle 43 for the drive wheel 46 and the groove wheel 47 is mounted on the platform 30 as illustrated in FIG. 2. If the crown on the road requires, the axle 43 can be mounted on the lower side of the platform 30 to raise the lower support member 20 of the gate 10 a sufficient distance to allow clearance while being moved across the opening 11.

Since the sliding gate structure 10 requires only the rollers 26 and 27, the drive unit 28, the track 49 and the electrical control circuit 61, 62 and 63, a sliding gate structure can be easily modified to add the drive unit of the invention by adding these components. Removal or replacement of the drive means 28 is easily accomplished by disconnecting the electrical connection and disconnecting the drive unit from the frame of the gate.

I claim as my invention:

1. A gate structure movable in a direction parallel to a fence structure between a first position closing an opening in the fence and a second position permitting passage through the opening, said gate structure comprising:
   track means being disposed on the ground surface and extending across said opening in the direction of movement for said gate;
   a gate having a support means at one end for movably supporting said one end on the fence structure;
   drive means disposed at the other end of said gate including a reversible electric motor driving a ground engaging wheel and a follower riding on said track means and a frame member having a platform portion connected to a bottom frame member of said gate and an upright portion connected to a forward vertical frame member of said gate, said upright portion of said frame member having a bent portion to provide an offset with a portion of the upright portion being spaced from the vertical member of said gate to provide a space therebetween for receiving an axle of said drive means, said motor being mounted on the platform with said drive means supporting said other end with said wheel and guiding said gate as it moves between said first and second position; and
   means for connecting said electrical motor to a power source and for controlling said motor to control the movement of said gate.

2. In a gate structure according to claim 1, wherein the upright portion provides a mounting surface and wherein a solenoid actuated latch device is mounted on said surface for engaging a latch member secured to a post of said fence structure.

3. In a gate structure according to claim 2, wherein said latch device includes a lock member movable from a locking position to an unlocking position by the solenoid and being resiliently mounted on a frame of said latch device enabling the entrance of the latch member as the gate moves to said first position.

References Cited

UNITED STATES PATENTS

| 1,326,995 | 1/1920 | Tomkinson | 49—358 |
| 2,746,745 | 5/1956 | Damon | 49—280X |
| 3,257,756 | 6/1966 | Mealer | 49—358X |
| 3,277,619 | 10/1966 | Miller et al. | 49—358X |

FOREIGN PATENTS

| 785,122 | 10/1957 | Great Britain | 49—358 |

J. KARL BELL, Primary Examiner

U.S. Cl. X.R.

49—264, 358, 360